(No Model.)

E. N. & W. J. GILFILLAN.
DOOR AND TERRACE STEP.

No. 314,374. Patented Mar. 24, 1885.

Attest:
Geo. L. Wheelock.
Victor A. Lewis.

Inventor;
E. N. Gilfillan
W. J. Gilfillan
By Knight Bros
Attys

UNITED STATES PATENT OFFICE.

ESSINGTON N. GILFILLAN, OF FORT SCOTT, KANSAS, AND WILLIAM J. GILFILLAN, OF ST. LOUIS, MISSOURI.

DOOR AND TERRACE STEP.

SPECIFICATION forming part of Letters Patent No. 314,374, dated March 24, 1885.

Application filed December 4, 1884. (No model.)

*To all whom it may concern:*

Be it known that we, ESSINGTON N. GILFILLAN, of Fort Scott, Bourbon county, Kansas, and WILLIAM J. GILFILLAN, of the city of St. Louis, Missouri, have invented a certain new and useful Improvement in Door and Terrace Steps, of which the following is a full, clear, and exact description, reference being had to the accompanying drawings, forming part of this specification, and in which—

Figure 1:
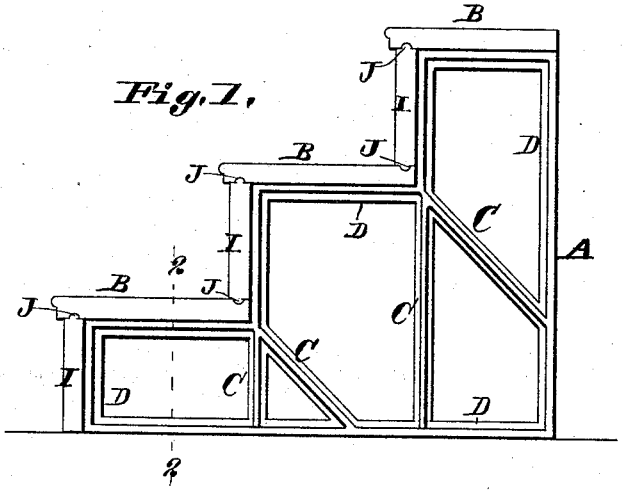
Figure 2:
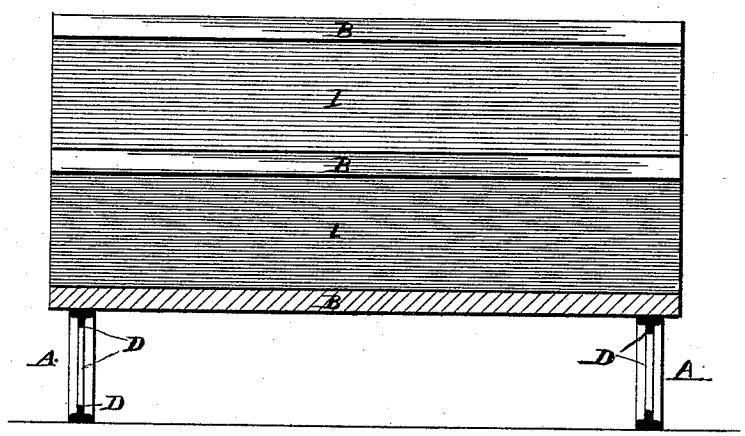

Figure 1 is an elevation of our improved step; and Fig. 2 is a vertical section taken on line 2 2, Fig. 1.

Our invention relates to an improved form of steps; and our invention consists in features of novelty hereinafter fully described, and pointed out in the claims.

Referring to the drawings, A represents the supports, I the "risers," and B the "treads," of the steps. The former consist of cast-iron frames having strengthening-braces C. All around the inside of the frames is a rib, D, that strengthens the frames. The form of these ribs and the shape of the outside of the frame is shown in Fig. 2.

The treads and risers consist of either real or artificial stone placed on the supports, as shown in Fig. 1, so that the appearance of the steps is that they consist of solid stone-work.

Steps thus made are cheap, are quickly put up, will last a long time, can be quickly taken down, if necessary, can be easily and conveniently shipped from the place where they are manufactured to the place where they are to be used, and they answer every purpose of solid stone steps.

The treads and risers are preferably locked together by tongues and grooves J, as shown in Fig. 1, to prevent any movement.

We claim as our invention—

1. The combination of the cast-iron supports having strengthening-braces and stone treads and risers, arranged as shown and described.

2. In combination with the cast-iron supports having strengthening-ribs extending all the way around, and strengthening-braces, the stone treads and risers, arranged substantially as shown and described.

3. The combination of the cast-iron supports having strengthening ribs and braces, and stone treads and risers locked together by tongues and grooves, substantially as and for the purpose set forth.

ESSINGTON N. GILFILLAN.
WILLIAM J. GILFILLAN.

In presence of—
GEO. H. KNIGHT,
SAML. KNIGHT.